US008989915B2

(12) United States Patent
Yamashiro

(10) Patent No.: US 8,989,915 B2
(45) Date of Patent: Mar. 24, 2015

(54) VEHICULAR WIRELESS COMMUNICATION APPARATUS AND COMMUNICATION SYSTEM

(75) Inventor: Takahisa Yamashiro, Chiryu (JP)

(73) Assignee: Denso Corporation, Kariya (JP)

( * ) Notice: Subject to any disclaimer, the term of this patent is extended or adjusted under 35 U.S.C. 154(b) by 137 days.

(21) Appl. No.: 13/596,462

(22) Filed: Aug. 28, 2012

(65) Prior Publication Data

US 2013/0054127 A1 Feb. 28, 2013

(30) Foreign Application Priority Data

Aug. 29, 2011 (JP) ................................. 2011-186335

(51) Int. Cl.
*G05D 1/00* (2006.01)
*G08G 1/16* (2006.01)

(52) U.S. Cl.
CPC ..................................... *G08G 1/163* (2013.01)
USPC ................... 701/1; 701/24; 701/80; 340/435; 340/457; 340/903; 342/455; 342/457

(58) Field of Classification Search
USPC ............ 701/1, 24, 96, 119, 80; 342/455, 457; 340/435, 905, 933
See application file for complete search history.

(56) References Cited

U.S. PATENT DOCUMENTS 7,363,117 B2 * 4/2008 Tengler et al. .................... 701/1
8,050,855 B2 * 11/2011 Coy et al. ...................... 701/119
8,352,112 B2 * 1/2013 Mudalige ........................ 701/24
2006/0095195 A1 * 5/2006 Nishimura et al. ............ 701/96

FOREIGN PATENT DOCUMENTS

DE 102007024877 * 12/2008
JP 2010-244290 10/2010

* cited by examiner

*Primary Examiner* — John Q Nguyen
*Assistant Examiner* — Aaron Smith
(74) *Attorney, Agent, or Firm* — Harness, Dickey & Pierce, PLC

(57) ABSTRACT

A vehicular wireless communication apparatus disposed in a subject vehicle determines whether a travel locus of the subject vehicle is similar to a travel locus of a lead vehicle. When the travel locus of the subject vehicle and the lead vehicle are similar, the apparatus transmits the lead vehicle's device identification (ID) and a latest position information of the subject vehicle in place of travel locus information of the subject vehicle from the apparatus to other vehicles at regular interval.

13 Claims, 6 Drawing Sheets

FIG. 5A

| | | |
|---|---|---|
| LATEST POSITION | LATITUDE | LONGITUDE |
| LOCUS POINT 1 | LATITUDE 1 | LONGITUDE 1 |
| LOCUS POINT 2 | LATITUDE 2 | LONGITUDE 3 |
| ... | ... | ... |
| LOCUS POINT N | LATITUDE N | LONGITUDE N |

FIG. 5B

| | | |
|---|---|---|
| DEVICE ID | 00001 | |
| LATEST POSITION | LATITUDE | LONGITUDE |

VEHICULAR WIRELESS COMMUNICATION APPARATUS AND COMMUNICATION SYSTEM

CROSS REFERENCE TO RELATED APPLICATION

This application is based on and claims the benefit of priority of Japanese Patent Application No. 2011-186335 filed on Aug. 29, 2011, the disclosure of which is incorporated herein by reference.

TECHNICAL FIELD

The present disclosure generally relates to a vehicular wireless communication apparatus and a communication system including the vehicular wireless communication apparatus.

BACKGROUND

Conventionally, a vehicle-to-vehicle communication is used to transmit information from one vehicle to the other vehicle, and the transmitted information is used on the receiving vehicle for determining a relative position of the other vehicle. For example, Japanese Patent Laid-Open No. 2010-244290 (JP '290) discloses a technique that determines whether the other vehicle is an oncoming vehicle relative to the subject vehicle or not, based on the position information and the travel information of the other vehicle and the position information and the travel direction of the subject vehicle.

In the technique of JP '290, the position information of only one point is transmitted. However, if such technique is extended, travel locus information of a vehicle including the position information of multiple points may be transmitted at one time (i.e., single transmission of information) through vehicle-to-vehicle communication, for determining the relative position of the vehicle and/or recognizing behaviors of the other vehicles in for example, a convoy travel of vehicles. That is, in a convoy of vehicles the relative positions and/or behaviors of the other vehicles relative to a subject vehicle can be recognized by the exchange of information through vehicle-to-vehicle communication, for securely organizing the convoy.

However, in such information transmission/exchange scheme, the transmitted position information of multiple points may cause a congestion of information if there are many vehicles densely/closely populated on the road that are transmitting, for example, travel locus information through vehicle-to-vehicle communication at substantially the same time.

SUMMARY

In an aspect of the present disclosure, a vehicular wireless communication apparatus is installed in a subject vehicle. The apparatus includes a position information acquisition unit, an information transmission unit, an information reception unit, a similarity determination unit, a lead vehicle determination unit, and a transmission information change unit. The position information acquisition unit successively acquires (i.e., one by one) position information indicating a current position of the subject vehicle. The information transmission unit successively transmits travel locus information via vehicle-to-vehicle communication, where the travel locus information includes the position information of multiple points acquired by the position information acquisition unit and identification (ID) information identifying the subject vehicle.

The information reception unit receives travel locus information and ID information from a transmitting vehicle via vehicle-to-vehicle communication. The similarity determination unit determines whether a travel locus of the subject vehicle and a travel locus of the transmitting vehicle are similar based on the travel locus information of the subject vehicle and the travel locus information of the transmitting vehicle. The lead vehicle determination unit determines whether the transmitting vehicle is a lead vehicle of the subject vehicle based on the travel locus information of the subject vehicle and the travel locus information of the transmitting vehicle.

The transmission information change unit changes the information transmitted by the information transmission unit from the travel locus information of the subject vehicle to an abridged information of the subject vehicle. Specifically, when the similarity determination unit determines that the travel locus of the subject vehicle and travel locus of the transmitting vehicle are similar and the lead vehicle determination unit determines that the transmitting vehicle is the lead vehicle of the subject vehicle, the transmission information change unit changes the information transmitted by the information transmission unit to the abridged information. The abridged information of the subject vehicle includes the ID information of the lead vehicle and a position related information of the subject vehicle including at least one of (a) latest position information from the position information acquisition unit and (b) information identifying the latest position information of the subject vehicle.

When the travel locus of the subject vehicle and the travel locus of the lead vehicle are similar, the abridged information, which has a smaller data size than the travel locus information of the subject vehicle, is transmitted one by one (i.e., successively) from the information transmission unit, in place of the travel locus information of the subject vehicle. Therefore, the information amount of vehicle-to-vehicle communication is reduced. As a result, the information congestion in vehicle-to-vehicle communication is prevented.

Further, the abridged information transmitted from the subject vehicle (i.e., a source of the abridged information, or an ab-info-source vehicle) includes the ID information of the lead vehicle, which has the travel locus similar to the subject vehicle. Therefore, the vehicular wireless communication apparatus in a third vehicle (e.g., a vehicle traveling behind the subject vehicle), which receives the abridged information from the subject vehicle, can identify the travel locus information of the lead vehicle by further receiving the travel locus information and the ID information of the lead vehicle (e.g., a vehicle traveling in front of the subject vehicle). Based on the similarity between the travel locus of the lead vehicle and the travel locus of the subject vehicle, which is transmitting the abridged information (i.e., the ab-info-source vehicle), the travel locus of the subject vehicle (i.e., the ab-info-source vehicle) can be estimated from the travel locus of the lead vehicle. As a result, the estimation of the travel locus of the subject vehicle transmitting the abridged information is enabled while preventing the information congestion in the vehicle-to-vehicle communication.

In addition to the above, when the abridged information is received by the information reception unit of the subject vehicle from a transmitting vehicle, the travel locus of the transmitting vehicle is estimated by a travel locus estimation unit. The travel locus estimation unit estimates the travel locus of the transmitting vehicle based on the travel locus information of a lead vehicle identified by the ID information and the position related information provided in the abridged information of the transmitting vehicle.

According to the above, based on (i) the travel locus information of the lead vehicle, which is a lead vehicle of the ab-info-source vehicle identified by the ID information in the abridged information and (ii) the position related information in the abridged information, the travel locus of the ab-info-source vehicle is estimated which is similar to the travel locus of the lead vehicle identified in the abridged information.

In addition to the above, when the information transmission unit is transmitting abridged information of the subject vehicle, the similarity determination unit may determine that the travel locus of the subject vehicle is no longer similar to the travel locus of the lead vehicle identified by the ID information in the abridged information of the subject vehicle. When such determination is made, the information transmission unit stops transmitting the abridged information of the subject vehicle, and resumes transmission of the travel locus information of the subject vehicle.

In addition, the apparatus may include a reception determination unit for determining whether the travel locus information of the lead vehicle identified by the ID information in the abridged information of subject vehicle, which is being transmitted by the information transmission unit, is no longer received by the information reception unit of the subject vehicle. If the reception determination unit determines that the travel locus information of the lead vehicle is no longer being received, the information transmission units stops transmitting the abridged information and resumes transmission of the travel locus information of the subject vehicle.

When the travel locus information of the lead vehicle, which is identified in the abridged information of the subject vehicle, is no longer received by surrounding vehicles, that is, vehicles around the subject vehicle no longer receive the lead vehicle's travel locus information, such vehicles may not be able to estimate the travel locus of the subject vehicle. To prevent such a problem, the information transmission unit stops transmitting the abridged information of the subject vehicle and resumes transmission of the travel locus information of the subject vehicle, thereby securely providing the travel locus of the subject vehicle to surrounding vehicles.

The reception determination unit may determine that the travel locus information of the lead vehicle identified by the ID information in the abridged information of the subject vehicle is no longer being received when the information reception unit has not received the travel locus information of the lead vehicle for a predetermined period of time. Therefore, even when the deterioration of the communication condition prevents the reception of the travel locus information of the lead vehicle, the apparatus stops the transmission of the abridged information and resumes transmission of the travel locus information of the subject vehicle, thereby enabling, for the surrounding vehicles, a secure acquisition of the travel locus of the subject vehicle.

The reception determination unit may determine that the travel locus information of the lead vehicle identified by the ID information in the abridged information of the subject vehicle is no longer being received when the information reception unit receives abridged information from the lead vehicle instead of travel locus information.

When the travel locus information of the lead vehicle has been changed to abridged information, surrounding vehicles cannot estimate the travel locus of the subject vehicle. Therefore, the apparatus stops the transmission of the abridged information of the subject vehicle and resumes transmission of the travel locus information of the subject vehicle, thereby enabling, for the surrounding vehicles, a secure acquisition of the travel locus of the subject vehicle.

When the information reception unit receives abridged information, the apparatus uses a use determination unit for determining whether the abridged information includes ID information of the subject vehicle to permit the use of the travel locus information of the subject vehicle. If the use determination unit determines that the ID information of the subject vehicle is included in the abridged information received, a change prohibition unit prohibits the transmission of the abridged information of the subject vehicle in place of the travel locus information of the subject vehicle.

In a case where the travel locus information of the subject vehicle is used by a transmitting vehicle to estimate the travel locus of the transmitting vehicle from the abridged information, if the information transmitted from the subject vehicle is changed from the travel locus information of the subject vehicle to the abridged information, other vehicles can no longer estimate the travel locus of the transmitting vehicle from the abridged information of the transmitting vehicle. Therefore, the apparatus of the subject vehicle prohibits the transmission of the abridged information in place of the travel locus of the subject vehicle. In other words, the information transmission unit maintains transmission of the travel locus information of the subject vehicle, thereby allowing other vehicles to securely estimate the travel locus of the transmitting vehicle.

In addition to the above, the position related information may be made from the latest position information of the subject vehicle acquired by the position information acquisition unit. Also, the position related information may also be made from the latest position information of the subject vehicle acquired by the position information acquisition unit and information capable of identifying a travel direction of the subject vehicle.

When a receiving vehicle receiving the abridged information has not received the travel locus information of the lead vehicle identified by the ID information in the abridged information of the subject vehicle, estimation of the travel locus of the subject vehicle transmitting the abridged information may not be possible. However, based on abridged information including the latest position information of the subject vehicle and information capable of identifying a travel direction of the subject vehicle, the receiving vehicle may roughly estimate the travel locus of the subject vehicle. The information capable of identifying the travel direction of the subject vehicle may include, for example, an azimuth angle of the subject vehicle or the position information of the subject vehicle one point prior to the latest point.

The information transmission unit may include a time stamp of the position information of multiple points when the travel locus information of a subject vehicle is being transmitted. Further, the apparatus of the present disclosure may include a delay time calculation unit for calculating a travel delay time of the subject vehicle relative to the transmitting vehicle, based on the time stamp of the position information of multiple points in the travel locus information of the subject vehicle and the time stamp of the position information of multiple points in the travel locus information of the transmitting vehicle. The delay time calculation unit calculates the travel delay time when (A) the similarity determination unit determines that the travel locus of the subject vehicle is similar to the travel locus of the transmitting vehicle and (B) the lead vehicle determination unit determines that the transmitting vehicle is a lead vehicle of the subject vehicle. Accordingly, when the information transmission unit transmits the abridged information of the subject vehicle instead of the travel locus information, the position related information includes the travel delay time of the subject vehicle, which is capable of identifying the latest position information of the subject vehicle.

When the travel delay time is determined, the latest position information of the subject vehicle acquired by the position information acquisition unit is identifiable, based on the travel locus information of the transmitting vehicle. Therefore, a receiving vehicle receiving the abridged information can estimate the travel locus of the subject vehicle transmitting the abridged information based on the travel locus information identified by the ID information and the travel delay time.

In addition to the above, the similarity determination unit may determine the similarity determination unit may determine that the travel locus of the subject vehicle is similar to the travel locus of the transmitting vehicle, when a ratio of successively-arranged multiple points represented by the position information in the travel locus information of the subject vehicle are respectively within a predetermined distance from travel locus segments defined by locus points of the transmitting vehicle is greater than or equal to a predetermined ratio. Otherwise, the similarity determination unit determines that the travel locus of the subject vehicle is not similar to the travel locus of the transmitting vehicle.

According to the above, even when the number of points in the position information in the travel locus information of the subject vehicle and the number of points in the position information in the travel locus information of the transmitting vehicle are different, similarity of the travel locus is determined based on a ratio against the number of points in the position information included in the travel locus information of the subject vehicle. Therefore, the similarity determination between the two travel loci is securely and stably performed. Where the number of points in the position information of the travel locus information is different between the travel locus of the subject vehicle and the travel locus of the transmitting vehicle may happen when, for example, the number of points in the position information in the travel locus information is configured to have a variable value depending on the shape of the road.

In addition to the above, the apparatus of the present disclosure further may include a same convoy identification unit for identifying the transmitting vehicle as being in the same convoy as the subject vehicle when multiple vehicles including the subject vehicle are traveling in a convoy formation. The similarity determination unit determines the similarity of the travel locus only with vehicles that are in the same convoy as the subject vehicle.

When the subject vehicle is traveling in a convoy, a vehicle not in the same convoy as the subject vehicle is not likely to have a travel locus similar to the subject vehicle. Accordingly, even when the travel locus information is received from such vehicle not in the same convoy, for example, the travel locus similarity determination by the similarity determination unit will not be performed for such vehicle. Therefore, process time and process load for performing the similarity determination for the vehicle that has only a low possibility of having the similar travel locus is saved.

In addition to the above, a communication system includes multiple vehicular wireless communication apparatuses described above respectively installed in multiple vehicles. Therefore, while reducing the amount of information transmitted through the vehicle-to-vehicle communication and preventing the information congestion in vehicle-to-vehicle communication, the receiving vehicle receiving the information can estimate the travel locus of the other vehicle by receiving only the abridged information, just like receiving the travel locus information having the position information of the multiple points.

BRIEF DESCRIPTION OF THE DRAWINGS

Other objects, features and advantages of the present invention will become more apparent from the following detailed description made with reference to the accompanying drawings, in which:

FIG. 5A is an illustration of travel locus information;

FIG. 5B is an illustration of abridged information; and

DETAILED DESCRIPTION

An embodiment of the present disclosure is described with reference to the drawings.

Figure 1:
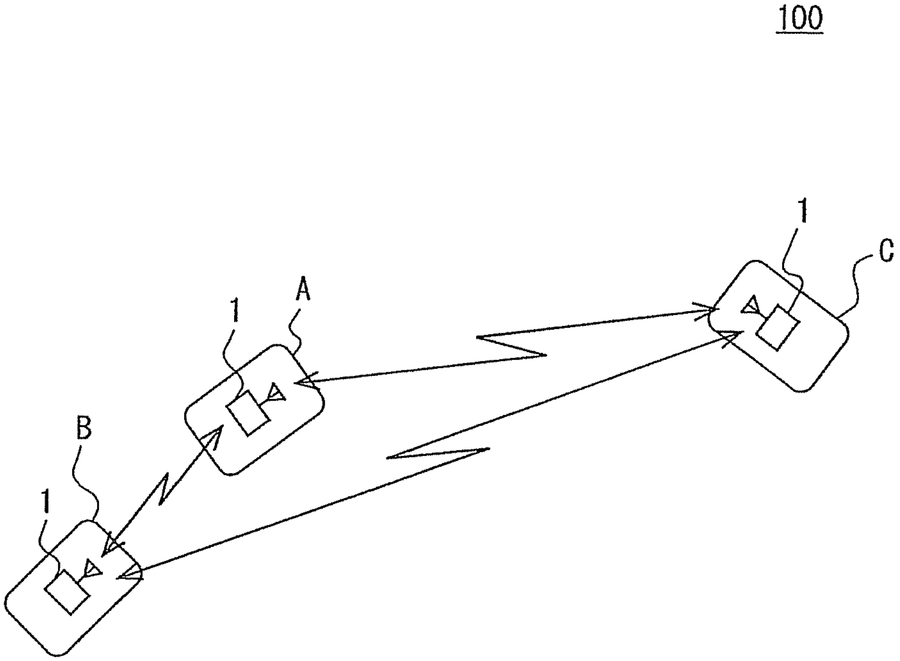
FIG. 1 is a block diagram of a communication system of the present disclosure.

With reference to FIG. 1 a schematic configuration of a communication system 100, which embodies the present disclosure, includes three wireless communication apparatuses 1 respectively installed in a vehicle A, a vehicle B, and a vehicle C.

The wireless communication apparatus 1 is installed in the vehicles A, B, C, which may be an automobile. FIG. 1 shows an example of the communication system 100 including three wireless communication apparatuses 1, however, the communication system 100 is not limited to only having three wireless communication apparatuses 1. That is, the communication system 1 may include two wireless communication apparatuses 1, or may include four or more wireless communication apparatuses 1. In the following description, the communication system 1 includes three wireless communication apparatuses 1 traveling on a road, in which the vehicle B follows the vehicle A.

Figure 2:
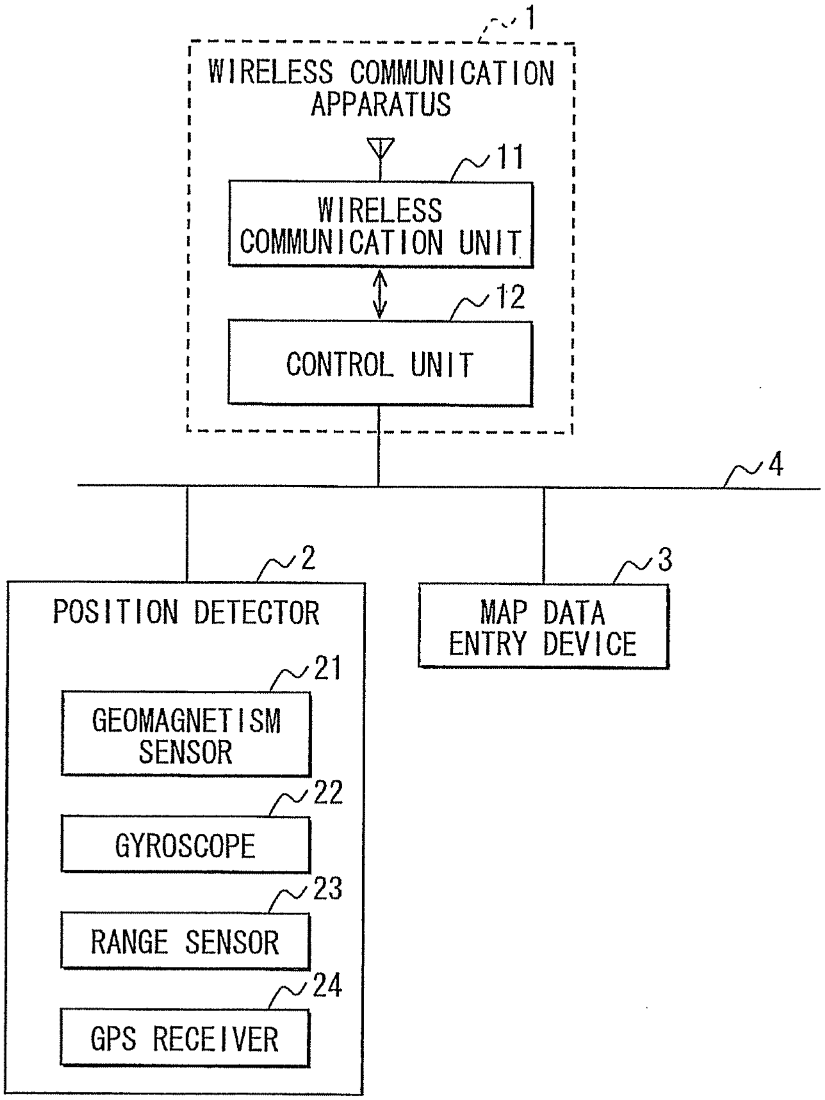
FIG. 2 is a block diagram of a wireless communication apparatus.

FIG. 2 shows a block diagram of the wireless communication apparatus 1, which is disposed in a subject vehicle, such as vehicle A, B, C. The wireless communication apparatus 1 includes a wireless communication unit 11 and a control unit 12. Further, the wireless communication apparatus 1 is communicably coupled to a position detector 2 and a map data entry device 3 of the subject vehicle. For example, in the present embodiment, the wireless communication apparatus 1, the position detector 2, and the map data entry device 3 are communicably coupled with each other through an in-vehicle local area network (LAN) 4 based on a communication protocol, such as controller area network (CAN). Further, the wireless communication apparatus 1 is equivalent to a vehicular wireless communication apparatus in claims.

The position detector 2 includes various sensors such as a geomagnetism sensor 21 detecting geomagnetism, a gyroscope 22 detecting the angular velocity around a vertical axis of the subject vehicle, a range sensor 23 detecting a travel distance of the subject vehicle, and a global positioning system (GPS) receiver 24 receiving an electric wave from the GPS satellites for detecting a current position of the subject vehicle. Based on information from such sensors with errors of different natures, the position detector 2 compensates the information with each other to accurately yield a current position and a travel direction of the subject vehicle.

Further, the sensors other than the GPS receiver 24 may be used in solo, or may be combined with other sensors not described above. Further, for example, the current position is represented by latitude and longitude, and, for example, the travel direction is measured from north. The travel direction represented by an azimuth angle may be detected by the geomagnetism sensor 21 or by the gyroscope 22, or by both of those sensors. The current position detected by the GPS receiver 24 is designated in the following as a satellite-measured position.

Further, though the GPS receiver 24 for receiving GPS signals is disclosed in the present embodiment, the satellite positioning may be a system other than the GPS, and the receiver may receive the signal from non GPS satellites.

The map data entry device 3 is for receiving map data stored in a storage medium (not illustrated), for example, the storage medium may be inserted into the map data entry device 3. The map data includes link data and node data representing a road. The link data has an ID for identifying a link (i.e., a link ID), a link length, a link direction, a link azimuth, node coordinates at a link start point and a link end point (i.e., a latitude and longitude), a road name, a road classification, a one way attribute, a road width, the number of traffic lanes, the number of right/left turn lanes and their attribute (existing or not), and other data such as speed limit value. The node data has a node ID identifying a node, which is an intersection, a fork position or the like of two or more roads, node coordinates, a node name, a connecting link ID, and other data such as an intersection type.

However, when the road has a curved shape, an interpolation point or two may be set between two nodes. That is, in such case, a link is divided into two or more segments at the interpolation point(s), and thus each segment has either the node or the interpolation point at its ends.

Further, the map data may be input from the medium set in the map data entry device 3, or may be input/received from a server, for example, through a server communication unit.

The wireless communication unit 11 of the wireless communication apparatus 1 has an antenna disposed on it, and performs delivery and reception of information through vehicle-to-vehicle communication, such as transmitting information of the subject vehicle and receiving information of other vehicles, without using a telephone network. For example, if the vehicle-to-vehicle communication uses a frequency band of 700 MHz, the subject vehicle can transmit information to the other vehicles within a range of 1 km, or if the vehicle-to-vehicle communication uses a frequency band of 5.9 GHz, the subject vehicle can transmit information to the other vehicles within a range of 500 m. The wireless communication unit 11 may be provided as an information transmission unit and a reception unit in claims. The wireless communication unit 11 transmits information according to instructions of the control unit 12 at regular intervals, such as every 100 msec. Further, the wireless communication unit 11 receives information transmitted from the wireless communication apparatus 1 of the other vehicles, and inputs the received information to the control unit 12.

The control unit 12 of the wireless communication apparatus 1 is provided as a well-known computer, having a CPU and memories (i.e., a ROM and a RAM and/or an EEPROM), as well as an input/output and a bus line for connecting these components (none illustrated). The control unit 12 performs various processes based on information from the wireless communication unit 11, the position detector 2, and the map data entry device 3.

The control unit 12 acquires position information regarding the current position of the subject vehicle, one by one. The position information of the subject vehicle may be, for example, acquired from the position detector 2. Therefore, the control unit 12 may be provided as a position information acquisition unit in claims. Further, the control unit 12 accumulates the position information acquired in a memory that is electrically re-writable, such as a RAM. The position information may be stored in the memory up to a predetermined amount (e.g., 20 entries), or for a predetermined period, and, after the predetermined amount or after the predetermined period, the position information may be erased by first-come first-served basis (i.e., FIFO basis: the oldest entry of the position information erased first). In the following, the accumulated collection of the position information in the memory, which represents a trace of travel of the subject vehicle, may be designated as travel locus information.

Further, when the position information is accumulated in the memory, the position information may be stored in the memory with a time stamp of either of a detection time by the position detector 2 or an acquisition time by the memory from the position detector 2.

In the present embodiment, accumulation of the position information in the memory is performed for a predetermined period. Further, in the present embodiment, the number of entries of the position information in the memory for the predetermined period is changed according to the shape of the road on which the subject vehicle is traveling. More specifically, when the subject vehicle is traveling a straight road such as, a highway, the information acquisition cycle by the control unit 12 may have a longer interval of, for example, 500 msec, or, when the subject vehicle is traveling a curved/meandering road such as a road on a mountain, the information acquisition cycle by the control unit 12 may have a shorter interval of, for example, 200 msec. In such manner, the number of entries of the position information for the predetermined period is smaller for the straight road than the curved road.

Further, the road shape may be determined based on the arrangement of the segments defined by the interpolation points in the map data. Further, when the road has a fewer interpolation points at a straight portion, the road shape may be determined based on the length of the segment in the map data.

The control unit 12 reads the accumulated travel locus information from the memory at regular intervals, and transmits the information from the wireless communication unit 11. That is, the travel locus information is transmitted at regular intervals from the wireless communication unit 11. When the travel locus information is transmitted, the control unit 12 adds, to the transmitted information, ID information that identifies the subject vehicle.

The ID information has a small data size and still enables identification of the subject vehicle. For example, a device ID of the wireless communication apparatus 1 or a vehicle ID of the subject vehicle may be utilized as the ID information. Further, the ID information may be information with fixed content, or may be information with variable or randomized contents. In the present embodiment, the device ID is used as the ID information.

The control unit 12 acquires travel locus information transmitted from the wireless communication apparatus 1 of the other vehicle through the wireless communication unit 11. Based on a comparison between the acquired travel locus information of the other vehicle and the travel locus information of the subject vehicle accumulated in the memory of the subject vehicle, a relative position of the other vehicle relative to the subject vehicle is calculated. Further, if the travel locus information has been collected/accumulated from each of the wireless communication apparatuses 1 on the other vehicles, each of the other vehicles is identified individually based on the comparison of the travel locus information, and a relative position of each of the other vehicles is individually calculated relative to the subject vehicle.

The control unit 12 identifies a lead vehicle that is traveling in front of the subject vehicle based on, for example, the relative position and the map data of the subject vehicle and the other vehicle, which may be the lead vehicle. The lead vehicle may be a vehicle immediately in front of the subject vehicle (a "right-ahead" vehicle) in the same lane of the road or in a different lane in the same travel direction, or may be a vehicle that is in front of the "right-ahead" vehicle of the subject vehicle. In an example of the present embodiment in FIG. 1, the vehicle A is the lead vehicle of the vehicle B. The lead vehicle may be identified based on the similarity of the travel locus between the subject vehicle and the other vehicle, without using the map data, when the travel locus of the other vehicle precedes the travel locus of the subject vehicle.

Further, the control unit 12 performs a change process to change (i.e., switch) the information, that is, to switch/replace the travel locus information of the subject vehicle with an abridged information that has a smaller information amount than the travel locus information. Specifically, the control unit 12 determines whether the travel locus of the other vehicle and the travel locus of the subject vehicle are similar based on the travel locus information of the subject vehicle and the travel locus information of the other vehicle. When the two travel loci are found to be similar with each other, the abridged information is transmitted from the wireless communication unit 11 in place of the travel locus information of the subject vehicle. The abridged information includes the device ID of the other vehicle, which has been added to the travel locus information of the other vehicle, thereby enabling the citation of the travel locus information of the other vehicle based on such device ID.

Figure 3:
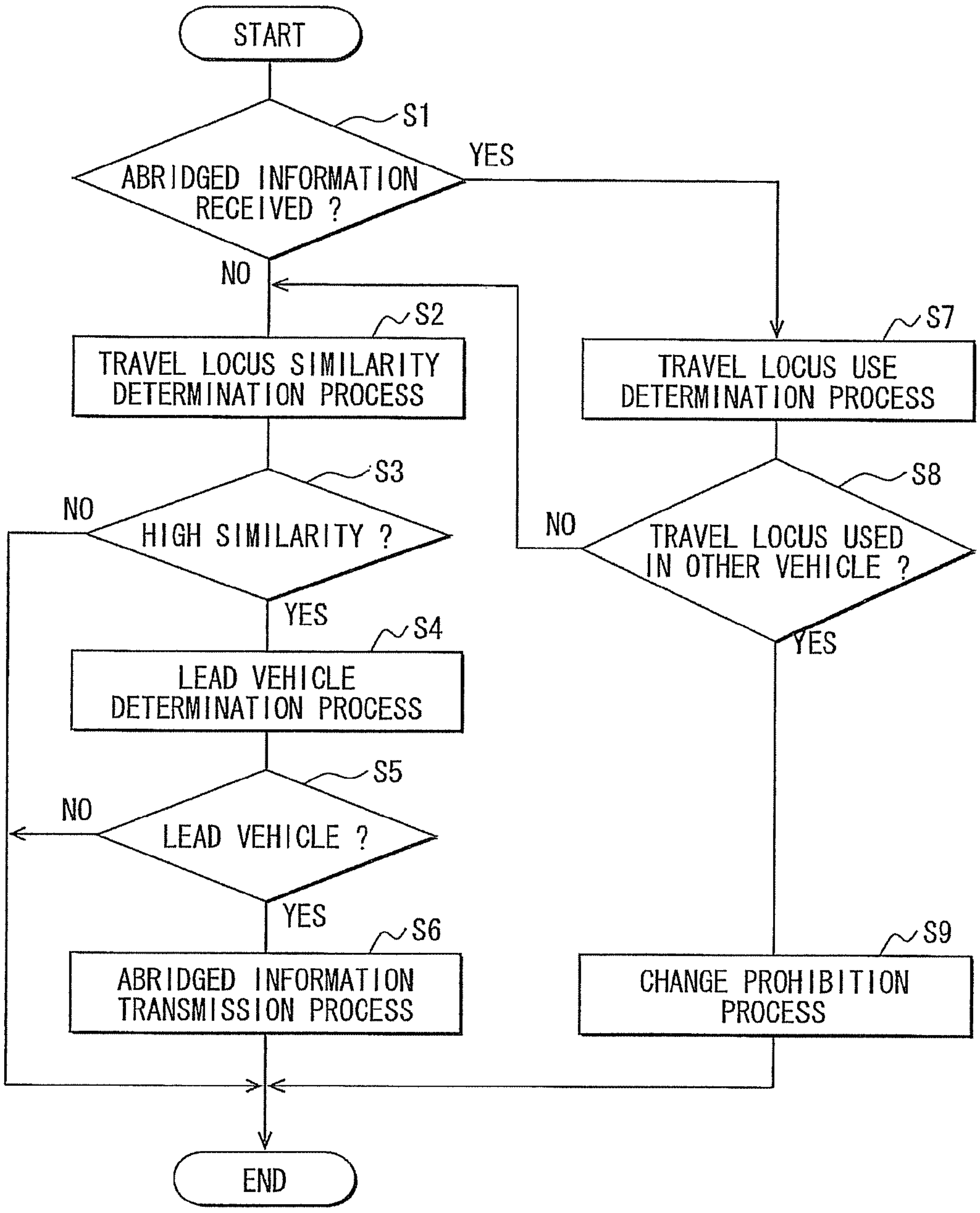
FIG. 3 is a flowchart of a change process performed by a control unit of the wireless communication apparatus.

With reference to FIG. 3, a change process performed by the control unit 12 of the wireless communication apparatus 1 is provided. The change process begins when information transmitted from the wireless communication apparatus 1 of the other vehicle is received by the wireless communication unit 11 of the subject vehicle.

The process, in S1, determines whether the information received is abridged information. It determines whether abridged information is received based on whether the device ID is included in the information. Or, the information may have a header indicating that the information is travel locus information or abridged information. When the information received is abridged information (S1, YES), the process proceeds to S7, and when the information receives is not abridged information (S1, NO), the process proceeds to step S2 and assumes that travel locus information has been received.

In S2, a travel locus similarity determination process is performed, and the process proceeds to S3 to determine if the travel loci are similar based on S2. The travel locus similarity determination process determines that the travel locus of the subject vehicle and the travel locus of the other vehicle are similar, when at least a certain number of successive points represented by the position information in the travel locus information of the subject vehicle (i.e., subject locus points hereinafter) are close to travel locus segments defined by the multiple points in the travel locus information of the other vehicle (i.e., other locus points hereinafter). More practically, when a subject locus point is within a predetermined distance from the travel locus segment defined by the other locus points, and a ratio of successive subject locus points that satisfy the predetermined distance condition against a total number of subject locus points meet a predetermined ratio, the two travel loci of the subject vehicle and the other vehicle are determined as similar. The control unit 12 is equivalent to a similarity determination unit in claims.

Figure 4:
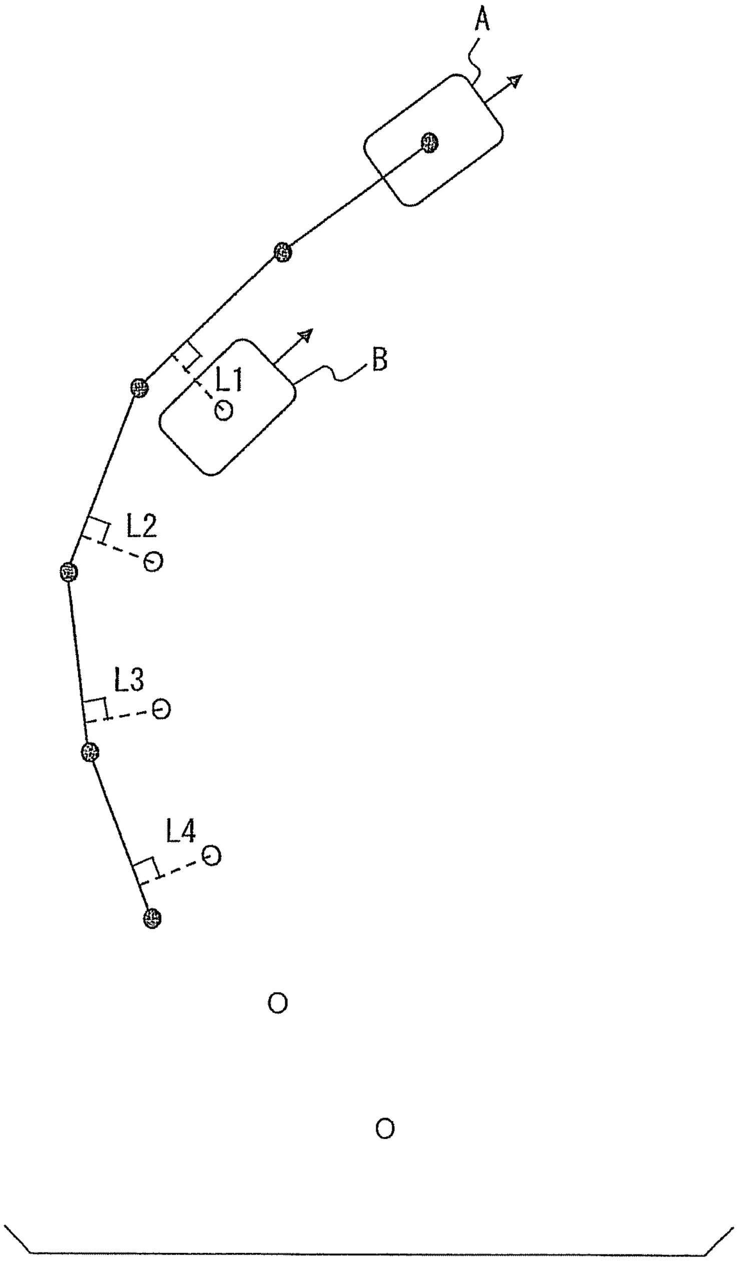
FIG. 4 is an illustration of a travel locus similarity determination process.

With reference to FIG. 4, the vehicle A is the other vehicle, and the vehicle B is the subject vehicle. Further, a black dot represents a travel locus point of the vehicle A (i.e., the other vehicle), and a white dot represents a travel locus point of the vehicle B (i.e., a subject vehicle).

In FIG. 4, a perpendicular line is drawn from each of the travel locus points of the vehicle B to a straight line (i.e., the travel locus segments) that links the travel locus points of the vehicle A. In such manner, a distance from the travel locus points of the vehicle B to a respective straight line of the vehicle A is determined (L1 to L4 in FIG. 4). Each of the determined distances is compared with a predetermined threshold distance of, for example, 2 meters. When the subject locus point is within the predetermined threshold distance, a ratio of the number of successive subject locus points that meet the predetermined threshold distance over the number of subject locus points is determined. If the ratio is within a predetermined ratio, the two travel loci of the vehicle A and the vehicle B are determined as similar. Otherwise, the two travel loci are determined as not similar.

Further, when a perpendicular line cannot be drawn from the subject locus point to a straight line of the other vehicle's travel locus, such subject locus point is determined as not under the threshold distance from the other vehicle's travel locus. The predetermined ratio and the predetermined threshold distance may both be arbitrarily determined.

In the present embodiment, the above configuration of determining the similarity of the travel locus may be changed or modified. For example, when the number of the travel locus points acquired by the control unit 12 and stored in the memory is known, the predetermined ratio described in the above may be switched to a predetermined number. In other words, when the number of successive subject locus points that meet the predetermined threshold distance is equal to or greater than the predetermined number, the two travel loci may be determined as similar.

Based on the travel locus similarity determination process, when the two travel loci are similar (S3, YES), the process proceeds to S4. If the two travel loci are not similar (S3, NO), the process concludes itself.

In S4, a lead vehicle determination process is performed, and then the process proceeds to S5 to determine whether a lead vehicle was determined by the lead vehicle determination process of S4. The lead vehicle determination process determines whether the origin of transmission of the travel locus information provided in S1 is from a lead vehicle of the subject vehicle. More specifically, when the other vehicle is determined as the lead vehicle, it is determined that the other vehicle is a lead vehicle of the subject vehicle. On the other hand, when the other vehicle is not determined as the lead vehicle, it is determined that the other vehicle is not a lead vehicle of the subject vehicle. As provided above, the other vehicle may be identified as a lead vehicle of the subject vehicle based on the relative position and the map data of the other vehicle and the subject vehicle. Or it may be based on the similarity of the travel locus between the subject vehicle and the other vehicle, without using the map data, when the travel locus of the other vehicle precedes the travel locus of the subject vehicle. Therefore, the control unit 12 may be provided as a lead vehicle determination unit in claims.

When a lead vehicle is determined by the lead vehicle determination process (S5, YES), the process proceeds to S6, and if a lead vehicle is not determined by the lead vehicle determination process (S5, NO), the process concludes itself.

In S6, an abridged information transmission process is performed. In the abridged information transmission process, the device ID of the wireless communication apparatus 1 and the latest position information of the subject vehicle accumulated in the memory (i.e., the latest position information acquired from the position detector 2), in place of the travel locus information of the subject vehicle, are transmitted from the wireless communication unit 11 at regular transmission intervals. Therefore, the control unit 12 may be provided as a transmission information change unit in claims, and the latest position information described above may be provided as the position related information in claims.

The details of the above are explained with reference to FIGS. 5A and 5B. FIG. 5A is an example of a travel locus information, and FIG. 5B is an example of an abridged information.

In FIG. 5A, the travel locus information of the subject vehicle includes the latest position information, that is, the, latest position and its coordinates (latitude/longitude) on the first line, which are acquired from the position detector 2, and multiple locus points, that is, the locus point 1 to N retroactively arranged in the following with their coordinates. In contrast, in FIG. 5B, the abridged information includes the latest position information (the latitude and longitude of the latest position) that is acquired from the position detector 2 and a device ID "00001" of the wireless communication apparatus 1 of the subject vehicle. In other words, the abridged information is formed as the device ID and the latest position information of the subject vehicle acquired from the position detector 2. Therefore, the amount of information or data size of the abridged information is reduced in comparison to the travel locus information.

Further, the ID information (i.e., the device ID) that is, for example, capable of specifying the subject vehicle as the origin of transmission of the travel locus information and/or the abridged information is included as a header to the travel locus information and/or the abridged information.

If the information received from the other vehicle is abridged information (S1, YES), the process, in S7, performs a travel locus use determination process, and the process proceeds to S8. The travel locus use determination process determines whether the travel locus information of the subject vehicle is used by the other vehicle. More specifically, it determines that the travel locus information of the subject vehicle is used in the other vehicle when the device ID of the wireless communication apparatus 1 of the subject vehicle is included in the abridged information that was received in step S1. On the other hand, it is determined that the travel locus information of the subject vehicle is not used by the other vehicle when the device ID of the wireless communication apparatus 1 of the subject vehicle is not included in the abridged information.

Therefore, the control unit 12 may be provided as a use determination unit in claims.

When the travel locus use determination process determines that the travel locus information of the subject vehicle is used by the other vehicle (S8, YES), the process proceeds to step S9. When the travel locus use determination process determines that the travel locus information of the subject vehicle is not used by the other vehicle (S8, NO), the process proceeds to S2.

In S9, a change prohibition process is performed, and the process concludes itself. The change prohibition process prohibits transmitting the abridged information in place of the travel locus information of the subject vehicle. More practically, for example, the process prohibits the change process or the abridged information transmission process until the subject vehicle stops receiving abridged information from other vehicles, which include the device ID of subject vehicle, for a period of time exceeding a predetermined threshold. From a point of view for saving an unnecessary process, it is preferable to prohibit the change process. Therefore, the control unit 12 may be provided as a change prohibition unit in claims.

According to the above-mentioned configuration, when the travel locus of the subject vehicle and the travel locus of the lead vehicle are similar, the abridged information having the smaller information amount than the travel locus information of the subject vehicle is transmitted, in place of the travel locus information of the subject vehicle, from the wireless communication apparatus 1 at regular transmission intervals. Therefore, such configuration of the present disclosure can reduce the information amount in the vehicle-to-vehicle communication.

Further, because the abridged information of the subject vehicle includes the device ID of the wireless communication apparatus 1 of the lead vehicle that has a similar travel locus as the subject vehicle (i.e., the device ID that can identify the lead vehicle), when the wireless communication apparatus 1 of another vehicle, which receives the abridged information of the subject vehicle has already received the travel locus information of the lead vehicle and the device ID that can identify the lead vehicle, the wireless communication apparatus 1 of the other vehicle can estimate the travel locus information of the subject vehicle, which is the origin of transmission of the abridged information, based on the travel locus information of the lead vehicle.

For instance, when the vehicle B, which is following the vehicle A and is having a similar travel locus as the vehicle A, transmits the abridged information with the device ID of vehicle A, the vehicle C can estimate the travel locus of the vehicle B based on the travel locus information of the vehicle A and the abridged information of the vehicle B.

As a result, while reducing the amount of information transmitted through the vehicle-to-vehicle communication and preventing the information congestion in such communication, wireless communication apparatus 1 receiving the information can estimate the travel locus of the other vehicle by receiving only the abridged information, just like receiving the travel locus information having the position information of the multiple points.

If a vehicle is estimating the travel locus of another vehicle from the abridged information of the other vehicle, which utilizes the travel locus information of the subject vehicle, it is difficult to perform such estimation when the information transmitted from the subject vehicle is switched from the travel locus information to the abridged information. However, by prohibiting the switching of the information from the travel locus information to the abridged information, the vehicle may securely estimate the travel locus of the other vehicle based on the abridged information received from the other vehicle, which provides the device ID of the subject vehicle, since the subject vehicle is transmitting its travel locus information and not the abridged information.

By devising the above configuration, even when the number of points in the position information in the travel locus information of the subject vehicle (i.e., the subject locus points) and the number of points in the position information in the travel locus information of the other vehicle (i.e., the other locus points) are different, the travel locus similarity determination process is performed based on a ratio against the number of points in the position information included in the travel locus information of the subject vehicle. Therefore, the similarity determination between the two travel loci is securely and stably performed.

Further, performing the lead vehicle determination process after the travel locus similarity determination process in FIG. 3 may be changed. For example, the similarity determination process may be performed after the lead vehicle determination process. Further, the lead vehicle determination process and the travel locus similarity determination process may be performed in parallel with each other, and, the process may proceed to step S6 (only) when the two travel loci are determined as similar and the other vehicle is determined as the lead vehicle. In such case, if one of the similarity determination and the lead vehicle determination is negative, the process may conclude itself.

Though the abridged information in the present embodiment is described as including the ID information (i.e., the device ID) and the latest position information, such configuration may be changed. That is, as long as (i) the abridged information includes at least the ID information that can identify the lead vehicle, which has the similar travel locus as the subject vehicle and (ii) the information amount of the abridged information is smaller than the travel locus information before change, the abridged information may include other information other than the latest position information.

For example, the abridged information may have include (i) the ID information that can identify the lead vehicle, which has the similar travel locus as the subject vehicle (ii) the latest position information acquired by the wireless communication apparatus 1 of, the subject vehicle, and (iii) the position information one point prior to the latest point (i.e., one-step-past information hereinafter . . . e.g., latitude/longitude of the locus point 1 relative to the latest position in the example of FIG. 5A). According to such configuration, the wireless communication apparatus 1 of the other vehicle (i.e., an information receiving side vehicle), which is receiving the abridged information, can calculate a motion vector of the subject vehicle (i.e., the "origin of transmission" vehicle or the transmission side vehicle) based on the latest position information and the one-step-past information included in the abridged information. Therefore, based on the above-described motion vector, the wireless communication apparatus 1 of the information receiving side vehicle determines a rough estimation of the travel locus of the transmission side vehicle, even when the information receiving side vehicle has not received the travel locus information of the vehicle that is identified by the ID information in the abridged information from the transmission side vehicle.

Further, the abridged information may include (i) the ID information that can identify the lead vehicle, (ii) the latest position information acquired by the wireless communication apparatus 1 of the subject vehicle, and (iii) the travel direction information of the subject vehicle. Subsequently, the information receiving side vehicle can calculate a motion vector of the transmission side vehicle (i.e., the "origin of transmission" vehicle) based on the latest position information and the travel direction information provided in the abridged information. Therefore, the information receiving side determines a rough estimation of the travel locus of the transmission side vehicle based on the motion vector, even when the information receiving side vehicle has not received the travel locus information of the vehicle that is identified by the ID information in the abridged information.

The travel direction information of the subject vehicle may be acquired from the position detector 2 of the subject vehicle. Further, when the travel direction information of the subject vehicle is not used, the position detector 2 may be configured not to detect the travel direction of the subject vehicle. Further, the position information one point prior to the latest point, or, the one-step-past information, and the travel direction information of the subject vehicle are equivalent to information that can identify the travel direction of the subject vehicle in claims.

Furthermore, the abridged information may be configured to include the ID information that can identify the lead vehicle and the latest position information and the position information of the multiple points in the past acquired by the wireless communication apparatus 1. That is, for example, the abridged information may include (i) the subject locus point (s) that cannot serve as a start point to draw a perpendicular line to the segments between the other locus points of the lead vehicle (i.e., locus points of the subject vehicle that are not similar to the lead vehicle) and (ii) the ID information that can identify the lead vehicle.

Furthermore, the abridged information may have a configuration that it includes (i) the ID information that can identify the lead vehicle and (ii) a travel delay time of the subject vehicle relative to the lead vehicle. The travel delay time of the subject vehicle may be calculated in the following manner. More practically, (i) the time stamps regarding the position information of the multiple points in the travel locus information of the subject vehicle and (ii) the time stamps regarding the position information of the multiple points in the travel locus information of the lead vehicle are used to calculate the travel delay time of the subject vehicle relative to the lead vehicle in the control unit 12 of the subject vehicle. Therefore, the control unit 12 may be provided as a delay time calculation unit in claims.

When the travel delay time of the subject vehicle relative to the lead vehicle is known, the latest position information of the subject vehicle acquired by the wireless communication apparatus 1 of the subject vehicle can be identified based on the travel locus information of the lead vehicle. Therefore, the travel locus of the subject vehicle transmitting the abridged information (i.e., the transmission side vehicle) can be estimated the information receiving side vehicle, based on the travel locus information of the subject vehicle that is identified by the ID information and the travel delay time in the abridged information.

Per the process of FIG. 2, when the control unit 12 of the subject vehicle has received the abridged information transmitted from the wireless communication apparatus 1 of the other vehicle through the wireless communication unit 11, the control unit 12 performs a travel locus estimation process to estimate the travel locus of the transmission side vehicle (i.e., the origin of transmission of the abridged information) based on the device ID included in the abridged information. Therefore, the control unit 12 may be referred to as a travel locus estimation unit in claims. The travel locus estimation process may be, for example, performed when it is determined that the travel locus information of the subject vehicle is not used by the other vehicle in step S8 of FIG. 3.

More specifically, in the travel locus estimation process, the travel locus information of an information transmitting vehicle identified by the device ID in the abridged information is searched for from among the received travel locus information already received by the subject vehicle. That is, the travel locus information of the lead vehicle of the information transmitting vehicle is searched for and identified. When the travel locus information of such vehicle is identified, the, travel locus prior to the above-described latest position information, in the abridged information is used as an estimation of the travel locus of the information transmitting vehicle transmitting the abridged information. In other words, a portion of the travel locus defined by the position information of the multiple points in the travel locus information identified is used as the estimation of the travel locus of the transmission side vehicle.

More practically, each of the positions represented by the position information in the travel locus information identified, that is, the travel locus points, is used to define the segments of the travel locus (i.e., locus segments, hereinafter), and, toward such segments, a perpendicular line is drawn from the position indicated by the latest position information in the abridged information (i.e., a latest own point, hereinafter). Then, (i) the travel locus points positioned prior to an intersection between the perpendicular line from the latest own point and one of the locus segments and (ii) the latest own point are used to define the estimation of the travel locus of the transmission side vehicle. The points prior to the above-described intersection means the multiple points represented by the "older" position information. Further, the travel locus information received by the subject vehicle is stored in the RAM or the like, that is, in an electrically re-writable memory, and is erased from the older information.

After estimating the travel locus of the information transmission side vehicle, such locus is handled in the same manner as the travel locus information of the other vehicle. Therefore, such locus is used to calculate the relative position relative to the subject vehicle, or used to identify each of the other vehicles. In such manner, based on the estimated travel locus of the transmission side vehicle and the travel locus of the subject vehicle, the relative position between the subject vehicle and the other vehicle can be determined.

Further, even when the control unit 12 has invoked a change to transmit the abridged information in place of the travel locus information of the subject vehicle, the control unit 12 may later perform a change cancellation process for canceling such change and for resuming the transmission of the travel locus information.

Figure 6:
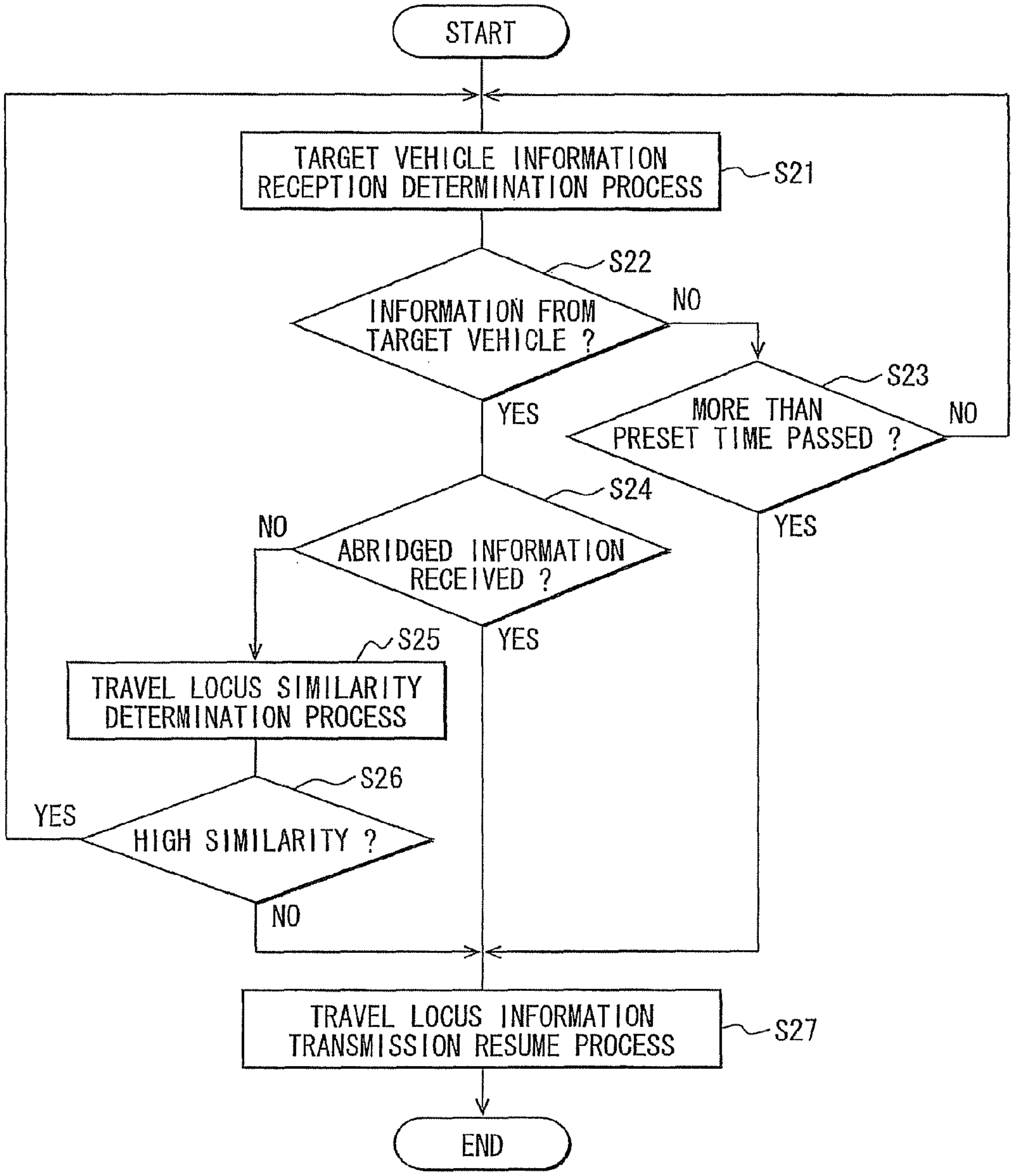
FIG. 6 is a flowchart of a change cancellation process performed by the control unit of the wireless communication apparatus.

With reference to a flowchart of FIG. 6, the change cancellation process is performed by the control unit 12 of the wireless communication apparatus 1. The process begins when a change is invoked to transmit the abridged information in place of the travel locus information of the subject vehicle.

First, in S21, a target vehicle information, reception determination process is performed, and the process proceeds to S22. The target vehicle information reception determination process determines whether information transmitted by a vehicle, which can be identified by the device ID included in the abridged information that is transmitted from the subject vehicle (i.e., a target vehicle) has been received. More specifically, when the information acquired by the wireless communication unit 11 is the information transmitted by the vehicle which can be identified by the device ID, it is determined that the information transmitted from the target vehicle has been received. On the other hand, when the information acquisition by the wireless communication unit 11 has not been performed or when the received information is from a vehicle that is not the one which can be identified by the device ID, it is determined that the information transmitted from the target vehicle has not been received.

In S22, when the target vehicle information reception determination process has determined that the information transmitted from the target vehicle has been received (S22, YES), the process proceeds to S24. If the target vehicle information reception determination process has determined that the information transmitted from the target vehicle has not been received (S22, NO), the process proceeds to S23.

In S23, the process determines whether a predetermined time has passed after the previous reception of the travel locus information from the target vehicle, without receiving the information again. The elapsed time from the previous reception of the travel locus information may be measured by storing, in the memory, the time of acquisition of the travel locus information by the wireless communication unit 11 in association with such travel locus information and by using a timer that counts time from such acquisition time. The predetermined time may be arbitrarily set.

When the process determines that the predetermined time has passed (S23, YES), the process proceeds to S27, and when the predetermined time has not passed (S23, NO), the process returns to S21 to repeat the process.

When, in S24, the abridged information is received from the target vehicle (S24, YES), the process proceeds to S27, assuming that the travel locus information of the target vehicle will no longer be received. Therefore, the control unit 12 may be referred to as a reception determination unit in claims. Further, the process proceeds to S25 when the travel locus information is received from the target vehicle (S24, NO).

In S25, a travel locus similarity determination process is performed, and the process proceeds to S26. When it is determined that the travel locus of the subject vehicle and the travel locus of the other vehicle are similar by the travel locus similarity determination process in S26 (S26, YES), the process returns to step S21 to repeat the process. When it is determined that the travel loci are not similar (S26, NO), the process proceeds to S27.

In S27, a travel locus information transmission resume process is performed, and the process concludes itself. In the travel locus information transmission resume process, the change to transmit the abridged information in place of the travel locus information of the subject vehicle is cancelled, and the transmission of the travel locus information of the subject vehicle is resumed.

When the travel locus of the lead vehicle identified by the device ID included in the abridged information of the subject vehicle is no longer similar to the travel locus of the subject vehicle, the wireless communication apparatus 1 of the other vehicle can no longer estimate the travel locus of the subject vehicle based on the travel locus information of the lead vehicle. According to the above configuration, when the travel locus of the subject vehicle can no longer be estimated from the travel locus information of the lead vehicle, the transmission of the abridged information from the subject vehicle is stopped and the transmission of the travel locus information of the subject vehicle is resumed. Therefore, a false estimation of the travel locus of the subject vehicle in the wireless communication apparatus 1 of the other vehicle is prevented.

Further, the transmission of the travel locus information of the subject vehicle is resumed when a predetermined time has passed after the previous reception of the travel locus information transmitted by the target vehicle without receiving the information again. Therefore, by stopping the transmission of the abridged information from the subject vehicle and by resuming the transmission of the travel locus of the subject vehicle at the time of communication condition deterioration that prevents/interrupts the reception of the travel locus information of the target vehicle, the other vehicle is enabled to securely receive the travel locus of the subject vehicle.

Furthermore, the transmission of the travel locus information of the subject vehicle is resumed when the abridged information transmitted from the target vehicle is received. Therefore, by stopping the transmission of the abridged information from the subject vehicle and by resuming the transmission of the travel locus of the subject vehicle at the time of switching from the travel locus information of the target vehicle to the abridged information, the other vehicle is enabled to securely receive the travel locus of the subject vehicle.

Although the present invention has been fully described in connection with the preferred embodiment thereof with reference to the accompanying drawings, it is to be noted that various changes and modifications will become apparent to those skilled in the art.

For instance, though the other vehicle in the above embodiment determines the similarity of the travel locus with the subject vehicle when receiving the travel locus information through the vehicle-to-vehicle communication, such configuration may be changed. That is, when the subject vehicle makes a fleet/convoy to travel as a group of vehicles, only the vehicle in the same fleet/convoy may determine the similarity of the travel locus with the subject vehicle.

The other vehicle can determine whether it is traveling in a certain fleet/convoy based on the following scheme. That is, for example, when a lead vehicle of a convoy is configured to transmit a convoy ID to convoy vehicles in the convoy in the course of transmission of a travel plan of a convoy travel to the convoy vehicles and the convoy vehicles is respectively configured to transmit information with such convoy ID, the convoy vehicles in the convoy can determine that it is in a certain convoy based on the convoy ID. Further, by using a device of the subject vehicle, the subject vehicle may determine that it is in a certain convoy based on a relative position of the subject vehicle relative to the other vehicle(s). Therefore, the control unit 12 may be provided as a same convoy identification unit in claims.

When the subject vehicle is traveling in a convoy, a vehicle not in the convoy of the subject vehicle is not likely to have a similar travel locus similar to the subject vehicle. According to the above configuration, even when the travel locus information is received from such vehicle not in the same convoy, for example, the travel locus similarity determination will not be performed for such vehicle. Therefore, it saves process time and process load for performing the travel locus similarity determination process about the vehicle that has only a low possibility of having the similar travel locus. Therefore, it saves process time and process load for performing the similarity determination by the similarity determination process about the vehicle that has only a low possibility of having the similar travel locus.

Such changes and modifications are to be understood as being within the scope of the present invention as defined by the appended claims.

What is claimed is:

1. A vehicular wireless communication apparatus disposed in a subject vehicle, the apparatus comprising:

a position information acquisition unit successively acquiring position information indicating a current position of the subject vehicle;

an information transmission unit successively transmitting travel locus information via vehicle-to-vehicle communication, the travel locus information including the position information of multiple points acquired by the position information acquisition unit and identification (ID) information identifying the subject vehicle;

an information reception unit receiving travel locus information and ID information from a transmitting vehicle via vehicle-to-vehicle communication;

a similarity determination unit determining whether a travel locus of the subject vehicle and a travel locus of the transmitting vehicle are similar based on the travel locus information of the subject vehicle and the travel locus information of the transmitting vehicle;

a lead vehicle determination unit determining whether the transmitting vehicle is a lead vehicle of the subject vehicle based on the travel locus information of the subject vehicle and the travel locus information of the transmitting vehicle; and a transmission information change unit changing the information transmitted by the information transmission unit from the travel locus information of the subject vehicle to an abridged information of the subject vehicle, the abridged information having a smaller amount of information than the travel locus information of the subject vehicle, wherein when the similarity determination unit determines that the travel locus of the subject vehicle and travel locus of the transmitting vehicle are similar and the lead vehicle determination unit determines that the transmitting vehicle is the lead vehicle of the subject vehicle, the transmission information change unit changes the information transmitted by the information transmission unit to the abridged information, the abridged information includes the ID information of the lead vehicle and a position related information of the subject vehicle includes at least one of (a) latest position information from the position information acquisition unit and (b) information identifying the latest position information of the subject vehicle.

2. The vehicular wireless communication apparatus of claim 1 further comprising:

a travel locus estimation unit for estimating a travel locus of the transmitting vehicle when the transmitting vehicle transmits abridged information to the information reception unit, wherein the travel locus of the transmitting vehicle is estimated based on the travel locus information of a lead vehicle identified by the ID information and the position related information provided in the abridged information transmitted by the transmitting vehicle.

3. The vehicular wireless communication apparatus of claim 1, wherein, the information transmission unit stops transmitting the abridged information and resumes transmission of the travel locus information, when the information transmission unit transmits the abridged information of the subject vehicle instead of the travel locus information of the subject vehicle and the similarity determination unit determines that the travel locus of the subject vehicle is no longer similar to the travel locus of the lead vehicle identified by the ID information in the abridged information of the subject vehicle.

4. The vehicular wireless communication apparatus of claim 1 further comprising:

a reception determination unit for determining whether the travel locus information of a lead vehicle identified in the ID information of the abridged information of the subject vehicle being transmitted by the information transmission unit is no longer received by the information reception unit, wherein the information transmission unit stops transmitting the abridged information and resumes transmission of the travel locus information of the subject vehicle, when the reception determination unit determines that the travel locus information of the lead vehicle is no longer received.

5. The vehicular wireless communication apparatus of claim 4, wherein, the reception determination unit determines that the travel locus information of the lead vehicle is no longer being received by the information reception unit when travel locus information has not been received for a period of time greater than or equal to a predetermined time threshold.

6. The vehicular wireless communication apparatus of claim 4, wherein, the reception determination unit determines that the travel locus information of the lead vehicle is no-longer being received by the information reception unit, when the information reception unit receives abridged information from the lead vehicle instead of travel locus information.

7. The vehicular wireless communication apparatus of claim 1 further comprising:

a use determination unit determining whether abridged information received by the information reception unit from a transmitting vehicle includes ID information of the subject vehicle; and a change prohibition unit prohibiting the information transmission unit from transmitting abridged information of the subject vehicle in place of the travel locus information of the subject vehicle, when the use determination unit determines the abridged information received by the information reception unit includes ID information of the subject vehicle.

8. The vehicular wireless communication apparatus of claim 1, wherein the position related information is based on a latest position information of the subject vehicle acquired by the position information acquisition unit.

9. The vehicular wireless communication apparatus of claim 1, wherein the position related information is based on a latest position information of the subject vehicle acquired by the position information acquisition unit and information identifying a travel direction of the subject vehicle.

10. The vehicular wireless communication apparatus of claim 1, the apparatus further comprising:

a delay time calculation unit calculating a travel delay time of the subject vehicle relative to the transmitting vehicle, wherein the information transmission unit includes a time stamp of the position information of multiple points transmitted in the travel locus information of the subject vehicle, the delay time calculation unit calculates the travel delay time based on the time stamp of the position information of multiple points in the travel locus information of the subject vehicle and the time stamp of the position information of multiple points in the travel locus information of the transmitting vehicle, and the position related information of the abridged information includes the travel delay time of the subject vehicle to identify the latest position information of the subject vehicle acquired by the position information acquisition unit when the transmission information change unit changes the information transmitted by the information transmission unit to the abridged information.

11. The vehicular wireless communication apparatus of claim 1, wherein, the similarity determination unit determines that the travel locus of the subject vehicle is similar to the travel locus of the transmitting vehicle, when a ratio of successively-arranged multiple points represented by the position information in the travel locus information of the subject vehicle are respectively within a predetermined distance from travel locus segments defined by locus points of the transmitting vehicle is greater than or equal to a predetermined ratio, and the similarity determination unit determines that the travel locus of the subject vehicle is not similar to the travel locus of the transmitting vehicle, when the ratio is less than the predetermined ratio.

12. The vehicular wireless communication apparatus of claim 1 further comprising:

a same convoy identification unit identifying the transmitting vehicle as being part of the same convoy as the subject vehicle when multiple vehicles including the subject vehicle are traveling in a convoy formation, wherein the similarity determination unit determines the similarity of the travel locus only with a transmitting vehicle that is determined by the same convoy identification unit to belong to the same convoy as the subject vehicle.

13. A communication system comprising:

a plurality of vehicles; and a wireless communication apparatuses disposed in each of the plurality of vehicles, the wireless communication apparatus including:

a position information acquisition unit successively acquiring position information indicating a current position of a subject vehicle, an information transmission unit successively transmitting travel locus information via vehicle-to-vehicle communication, the travel locus information including the position information of multiple points acquired by the position information acquisition unit and identification (ID) information identifying the subject vehicle, an information reception unit receiving travel locus information and ID information from a transmitting vehicle via vehicle-to-vehicle communication, a similarity determination unit determining whether a travel locus of the subject vehicle and a travel locus of the transmitting vehicle are similar based on the travel locus information of the subject vehicle and the travel locus information of the transmitting vehicle, a lead vehicle determination unit determining whether the transmitting vehicle is a lead vehicle of the subject vehicle based on the travel locus information of the subject vehicle and the travel locus information of the transmitting vehicle, and a transmission information change unit changing the information transmitted by the information transmission unit from the travel locus information of the subject vehicle to an abridged information of the subject vehicle, the abridged information having a smaller amount of information than the travel locus information of the subject vehicle, wherein when the similarity determination unit determines that the travel locus of the subject vehicle and travel locus of the transmitting vehicle are similar and the lead vehicle determination unit determines that the transmitting vehicle is the lead vehicle of the subject vehicle, the transmission information change unit changes the information transmitted by the information transmission unit to the abridged information, the abridged information includes the ID information of the lead vehicle and a position related information of the subject vehicle includes at least one of (a) latest position information from the position information acquisition unit and (b) information identifying the latest position information of the subject vehicle.

* * * * *